United States Patent [19]

Backstrom

[11] 4,201,007
[45] May 6, 1980

[54] FISHING LURE

[76] Inventor: Arthur Backstrom, 7204 S. Avers Ave., Chicago, Ill. 60629

[21] Appl. No.: 937,044

[22] Filed: Aug. 28, 1978

[51] Int. Cl.² .............................................. A01K 85/00
[52] U.S. Cl. ................................................... 43/42.12
[58] Field of Search ....................................... 43/42.12

[56] References Cited

U.S. PATENT DOCUMENTS

| | | | |
|---|---|---|---|
| D. 218,966 | 10/1970 | Weimer | 43/42.12 |
| 2,002,117 | 5/1935 | Lavitt | 43/42.12 |
| 2,378,370 | 6/1945 | Van Buren | 43/42.12 |
| 2,574,293 | 11/1951 | Sabin et al. | 43/42.12 |
| 2,653,408 | 9/1953 | Bradley | 43/42.12 |
| 3,439,443 | 4/1969 | Weimer | 43/42.12 |

*Primary Examiner*—Othell M. Simpson
*Assistant Examiner*—J. T. Zatarga
*Attorney, Agent, or Firm*—Kinzer, Plyer, Dorn & McEachran

[57] ABSTRACT

A fishing lure having a pair of concentric circular spinners. The spinners are mounted on a central rod and are free to rotate about that rod. Each spinner has a pair of bevelled surfaces on its outside rim. The surfaces are located adjacent to the axis of rotation and are disposed on either side of it. The bevelled surfaces are inclined from opposite edges of the rim to form a surface that acts like a propeller. Water acting against the bevelled surfaces tends to cause the spinner to rotate about the rod.

2 Claims, 2 Drawing Figures

FISHING LURE

SUMMARY OF THE INVENTION

This invention relates to artificial fishing lures and in particular, to animated lures.

A primary object of this invention is a fishing lure having an attention-attracting motion.

Another object is a fishing lure having a simple design with few moving parts.

Another object is a fishing lure which is inexpensive to manufacture.

Another object is a fishing lure having a rugged construction which will not be easily damaged.

Another object is a lure which will resist snagging on objects encountered under water.

Another object is a lure which is symmetrical about its center point so that it will function properly regardless of which ends are attached to the associated line and hook.

Accordingly, the invention is directed to a lure having a pair of concentric circular spinners. These are mounted on a central rod and are free to rotate thereon. The spinners are essentially donut-shaped. Preferably, they are made of plastic material, either colored or transparent. The material selected for the spinner should have a high reflectivity so that sunlight shining on it makes it sparkle. This has been found to attract the attention of nearby fish.

The spinners have inclined surfaces at their leading edges which act in the fashion of a propeller to cause the spinners to rotate under the influence of water pressure onthe surfaces. The inclined surfaces are oppositely directed so that the two spinners rotate in opposite directions.

DESCRIPTION OF THE PREFERRED EMBODIMENT

The fishing lure 10 consists of two concentric rings or spinners mounted for rotation on a central rod. Both the larger, outer spinner 12 and the smaller inside spinner 14 are made of clear plastic. The spinners have holes drilled on two sides, in line with the center of the spinner, to permit the rod or wire 16 to fit through for mounting the spinners.

Figure 1:
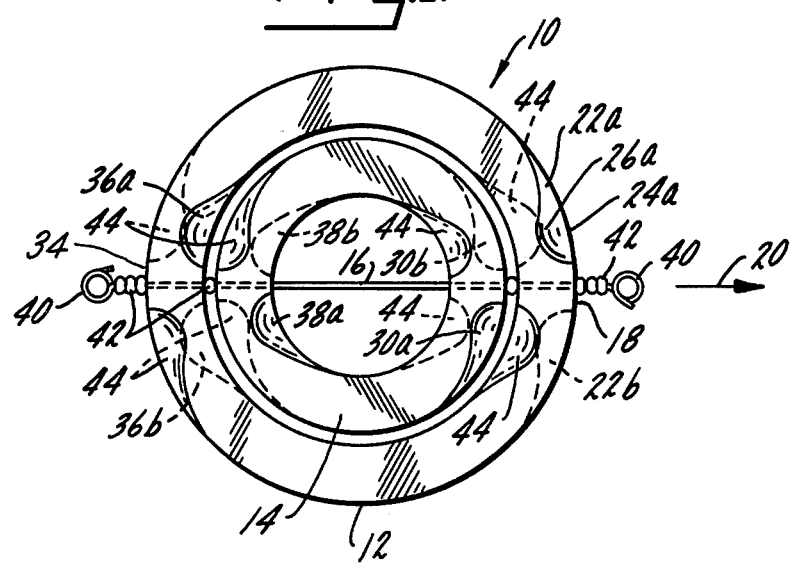
FIG. 1 is a plan view of the lure with both spinners shown in the same plane.

Each spinner has a pair of primary bevelled surfaces on the rim of its front edge. In FIG. 1, the front edge 18 is determined by the direction in which the lure 10 will be pulled. This direction is shown by arrow 20. The bevelled surfaces are located adjacent to and on either side of the rod 16.

Figure 2:
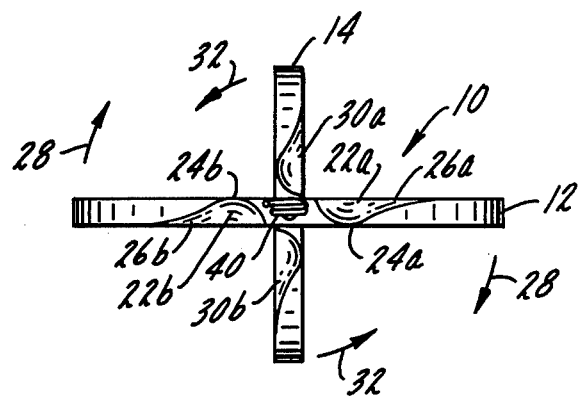
FIG. 2 is an end view of the lure with the spinners located at 90° to each other.

Each bevelled or tapered surface extends from a leading edge of the spinner back toward a trailing edge. Looking a FIG. 2, the tapered surface pair 22a and 22b of the outside spinner 12 start from a leading edge 24a and 24b and sweep backwardly toward a trailing edge 26a and 26b. This portion of the spinner is cut away to form the bevelled surfaces 22a and 22b. It will be noted that the leading edges 24a and 24b are on opposite sides of the spinner 12. This configuration causes the surfaces to act somewhat in the fashion of a propeller. Water forces, arising from either flowing water or pulling on the lure, create a pressure differential across the thickness of the spinner. Decreased resistance to water flow at the trailing edges 26a and 26b allows the pressure at the leading edges 24a and 24b to drive the spinner in a clockwise direction, as indicated by arrows 28. The bevelled surface pair 30a and 30b of the inside spinner 14 is constructed in the same manner with the exception that the leading and trailing edge sides are reversed. This causes the inside spinner 14 to rotate in a counterclockwise direction as shown by arrows 32.

The spinners must be thick enough to allow this tapered surface to be cut in them. Also, they have to be thick enough to allow the rod 16 to be threaded through them. It has been found that a 3/16" thick clear plastic ring is sufficient to permit the desired construction. However, the 3/16" thickness is by no means critical.

In addition to the bevelled surface pairs along the front end 18 of the lure, there may be provided corresponding pairs of secondary surfaces on the lead side of the spinners at the following end 34. Thus, secondary bevelled surfaces 36a and 36b will have the same rotational effect on spinner 12 as the leading or primary surfaces 22a and 22b. Likewise, on the inside spinner 14, surfaces 38a and 38b are provided.

The ends of the wire or rod 16 are looped and twisted to form an eye 40. There is an eye at either end of the lure. This provides an attachment point for suitable hooks, line and sinkers. The glass beads 42 are inserted in the wire or rod 16 on both sides of the large spinner 12. The glass beads are used as spacers and also promote free movement of the spinners.

It will be noted that in addition to the set of bevelled surfaces described above, i.e., 22a, 22b, 30a, 30b, 36a, 36b, and 38a, 38b, there is a corresponding set which would come into play if the lure were pulled in a direction opposite that of arrow 20. These alternate bevelled surfaces are shown, for example, at 44. They are directed in the same manner as the primary set of surfaces and perform the same function. Thus, it can be seen that the lure is symmetrical about its center point. This has the advantage that the hooks and lines can be attached to either eye 40. This simplifies use of the lure because the user will not have to stop and figure out which end he should attach the line to to make the spinners rotate properly.

I claim:

1. A fishing lure comprising:
    a rod;
    an outside circular spinner rotatably mounted on the rod and having pairs of primary and secondary bevelled surfaces located on the front outside and following inside rim respectively, each pair being located adjacent to and on either side of the rod, the primary and secondary surfaces on a first side of the rod beginning at the rim on a first face of the spinner and angling across the spinner thickness to a second spinner face while the primary and secondary surfaces on the second side of the rod begin at the rim of the second spinner face and angle across the spinner thickness to the first face; and
    an inside circular spinner rotatably mounted on the rod and having pairs of primary and secondary bevelled surfaces located on the front outside and following inside rim respectively, each pair being located adjacent to and on either side of the rod, each bevelled surface of the inside spinner angling across the spinner thickness in the opposite direction from the correspondingly located surface on the outside spinner so that the spinners rotate in opposite directions about the rod.

2. The structure of claim 1 further comprising an alternate set of bevelled surfaces which are located so as to make the lure symmetrical about the center of the concentric circular spinners.

* * * * *